United States Patent Office 3,105,746
Patented Oct. 1, 1963

3,105,746
PURIFICATION OF SODIUM BOROHYDRIDE
William H. Schechter, Zelienople, Pa., assignor, by mesne assignments, to Callery Chemical Company, Pittsburgh, Pa., a corporation of Pennsylvania
No Drawing. Filed Dec. 22, 1955, Ser. No. 554,611
2 Claims. (Cl. 23—312)

This invention relates to a new and improved method of purifying crude sodium borohydride. In particular, it relates to a simple and economical method of extracting sodium borohydride from mixtures containing $NaBH_4$, $NaOCH_3$ and other by-products by treatment of said mixtures with a polyethylene glycol dimethyl ether.

There are several known methods for preparing sodium borohydride. In one of these methods, sodium hydride is allowed to react with trimethyl borate to yield a mixture of sodium borohydride and sodium methoxide. The crude $NaBH_4$ thus produced is of rather low purity and must be further purified before it can be used in other reactions. In United States Patent 2,542,746 there is described a method of purification which involves treating the crude $NaBH_4$ with a large excess of water. However, in this method a dihydrate of $NaBH_4$ is formed which is difficult to remove. The need for pure $NaBH_4$ has increased rapidly in recent years since it shows promise as a specific reducing agent in the preparation of various complex pharmaceutical compounds. $NaBH_4$ is convenient to use in either aqueous or alcoholic solutions depending upon the solubility of the substance to be reduced. For compounds which react with alcohols, a polyethylene glycol dimethyl ether such as diethylene glycol dimethyl ether or tetraethylene glycol dimethyl ether may be used as the solvent. Standard procedure up to the present time has been to isolate the dry $NaBH_4$ from the crude mixture containing $NaOCH_3$ and other by-products by extraction with liquid ammonia, then dissolving the purified $NaBH_4$ in the solvent used for the desired reaction. It was, therefore, considered highly desirable to develop a method of extracting pure $NaBH_4$ from the crude mixture by using a solvent which is useful in the further reaction of $NaBH_4$ with other compounds. In this manner, the step of isolating dry $NaBH_4$ would be eliminated resulting in a more simplified and economical separation.

It is one object of this invention to provide a new and improved method of purifying crude sodium borohydride.

Another object is to provide a simple and economical method of extracting sodium borohydride from mixtures containing it and other by-products such as sodium methoxide.

Other objects will appear throughout the following specification and appended claims.

This new and improved method of purifying crude $NaBH_4$ will be more fully described hereinafter and the novelty thereof will be particularly pointed out and distinctly claimed.

The present invention is based upon the discovery that sodium borohydride can be separated directly from sodium methoxide and other impurities formed during its preparation by extraction with a polyethylene glycol dimethyl ether. This procedure circumvents the isolation of dry $NaBH_4$ from the crude mixture by extraction with liquid ammonia and subsequently dissolving the pure $NaBH_4$ in the polyethylene glycol dimethyl ether. In this manner a solution of $NaBH_4$ in a polyethylene glycol dimethyl ether is obtained directly thus eliminating the step of isolating dry $NaBH_4$. It has also been found that when such a solution of $NaBH_4$ in diethylene glycol dimethyl ether is cooled and $NaBH_4$ crystallized therefrom, the product obtained is of a substantially higher purity than that obtained with other solvents.

Experimentally, four single extractions of crude sodium borohydride containing sodium methoxide and other impurities were carried out. In two of these extractions, 5 g. of crude $NaBH_4$ were treated with 60 ml. of liquid ammonia. In the other two extractions, the same amount of crude $NaBH_4$ was treated with 60 ml. of diethylene glycol dimethyl ether, $CH_3(OC_2H_4)_2OCH_3$. When ammonia was used for extraction, it was evaporated from the extract and the dry extract was hydrolyzed and the evolved hydrogen measured. When diethylene glycol dimethyl ether was used for extraction, the extract solution itself was hydrolyzed and the evolved hydrogen measured. The table below gives the results of two extractions with each solvent.

|  | $NH_3$ | M2M[2] | $NH_3$ | M2M[2] |
|---|---|---|---|---|
| Total meqs.[1] of $H_2$ in sample | 106.8 | 94.0 | 123.0 | 120.7 |
| Total meqs.[1] of $H_2$ recovered in extract | 97.0 | 79.4 | 110.1 | 95.6 |
| Percent $H_2$ recovered in extract | 90.5 | 84.5 | 89.6 | 79.3 |

[1] Meqs. means milliequivalents.
[2] M2M means diethylene glycol dimethyl ether.

From these results it is apparent that diethylene glycol dimethyl ether is nearly as efficient as ammonia as a solvent for extracting $NaBH_4$ from crude mixtures.

When crude $NaBH_4$ is extracted with diethylene glycol dimethyl ether and the resulting solution cooled to about 0° C., substantially all of the $NaBH_4$ is crystallized from the solution. The $NaBH_4$ crystals thus obtained have a purity of 95–99% as compared to about 90% purity for $NaBH_4$ obtained by ammonia extraction.

Since $NaBH_4$ is appreciably soluble in other polyethylene glycol dimethyl ethers and $NaOCH_3$ is substantially insoluble in said ethers, it is possible to extract pure $NaBH_4$ from crude mixtures by using triethylene glycol dimethyl ether or tetraethylene glycol dimethyl ether as the extracting solvent in place of diethylene glycol dimethyl ether. As in the case of diethylene glycol dimethyl ether, the $NaBH_4$ may be used in solution for further reaction or may be crystallized from solution. The purity of $NaBH_4$ extracted in the manner described is substantially 100%.

Having thus described this invention fully and completely as required by the patent statutes, what is desired to be claimed and secured by United States Patent is:

1. A process for the purification of sodium borohydride obtained by the reaction of sodium hydride with an alkyl borate which comprises extracting said borohydride with the dimethyl ether of diethylene glycol and recovering the resultant ether solution containing the sodium borohydride dissolved therein.

2. A method of purifying crude sodium borohydride containing sodium methoxide which comprises treating the crude sodium borohydride with the dimethyl ether of diethylene glycol to dissolve sodium borohydride and thereby produce a solution of the borohydride in said ether, and separating and recovering the resultant ether solution containing the sodium borohydride dissolved therein.

References Cited in the file of this patent

UNITED STATES PATENTS

| 2,534,533 | Schlesinger | Dec. 19, 1950 |
| 2,545,633 | Schlesinger et al. | Mar. 20, 1951 |
| 2,656,243 | Bragdon | Oct. 20, 1953 |
| 2,683,721 | Schlesinger et al. | July 13, 1954 |
| 2,684,888 | Pryde | July 27, 1954 |

(Other references on following page)

UNITED STATES PATENTS

| | | | |
|---|---|---|---|
| 2,720,444 | Banus et al. | | Oct. 11, 1955 |
| 2,729,540 | Fischer | | Jan. 3, 1956 |
| 2,856,428 | Brown | | Oct. 14, 1958 |
| 2,889,194 | McElroy et al. | | June 2, 1959 |
| 2,938,767 | Huff et al. | | May 31, 1960 |
| 2,994,586 | Huff | | Aug. 1, 1961 |

OTHER REFERENCES

Sodium Borohydride, Bulletin 502A, published by Metal Hydrides, Inc.

Schechter et al.: "Boron Hydrides and Related Compounds," prepared under Contract No. z(s) 10992, by Callery Chemical Co., printed March 1951.